Oct. 31, 1967 M. DOSTRUP 3,350,070
SILO PLANT
Filed March 4, 1966
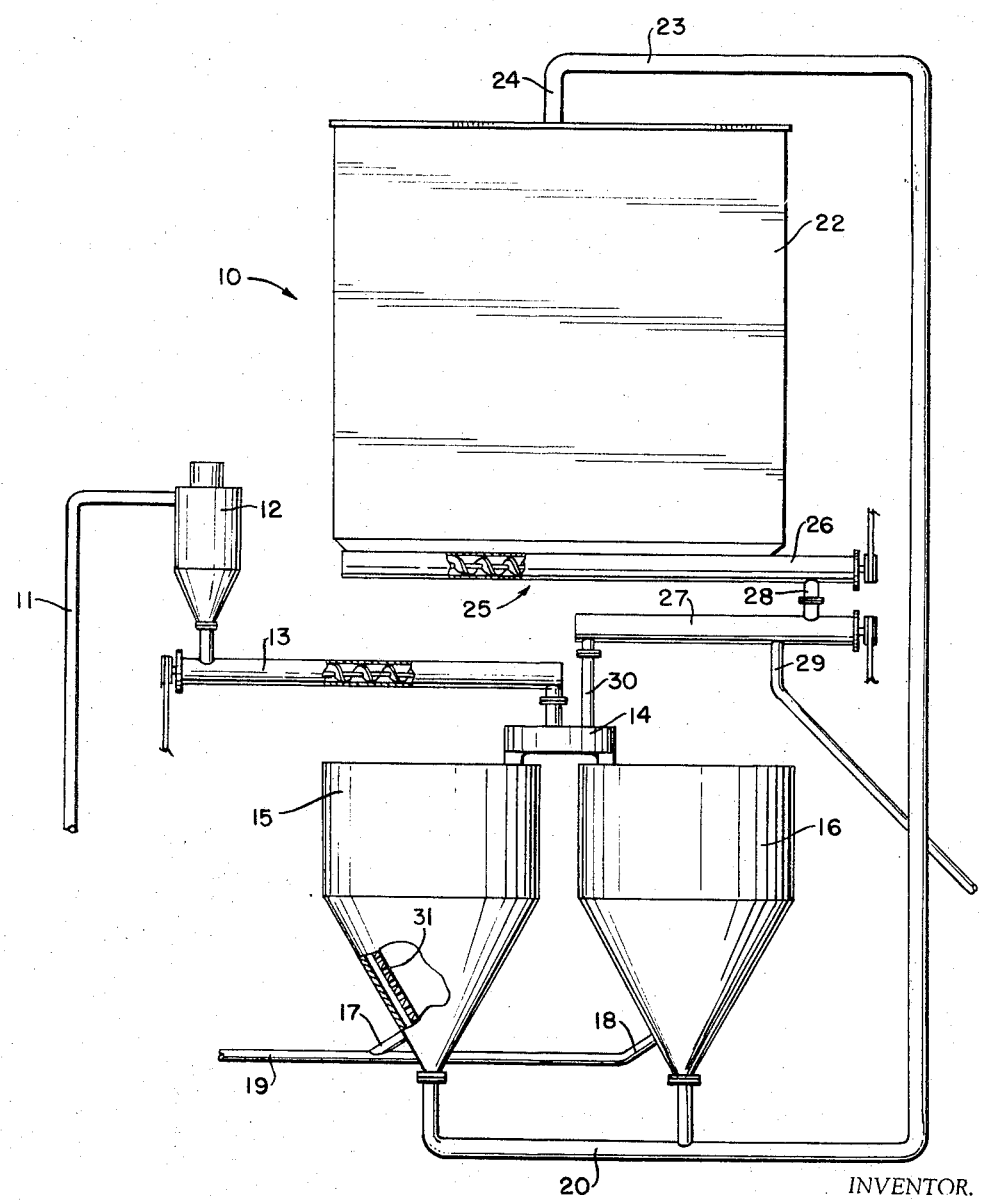
INVENTOR.
MAX DOSTRUP
ATTORNEYS

United States Patent Office 3,350,070
Patented Oct. 31, 1967

---

3,350,070
SILO PLANT
Max Dostrup, Copenhagen-Valby, Denmark, assignor to F. L. Smidth & Co., New York, N.Y., a corporation of Delaware
Filed Mar. 4, 1966, Ser. No. 532,003
Claims priority, application Denmark, Mar. 12, 1965, 1,267/65
3 Claims. (Cl. 259—60)

This invention relates to a silo plant and more particularly it relates to a silo plant having one or more homogenizing silos, one or more storage silos mounted above the homogenizing silos and means for transferring homogenized material from the homogenizing silos to the storage silos.

Silo plants such as those used in the cement industry for storing pulverulent raw materials which are used as the starting material in the manufacture of cement by the "dry method," have various structural arrangements. In one type of plant, the storage silos and the homogenizing silos are arranged side by side on the same level and are provided with conveying means for conveying material from the homogenizing silos to the storage silos; these plants require a complicated installation for the conveyance of raw materials and in addition a large floor area.

In a second type of known combined storage silo plant and homogenizing silo plant, attempts have been made to eliminate the drawbacks of the first type plant by constructing plant with the homogenizing silos mounted on top of the storage silos. This structural arrangement offered advantages in that less floor area was required for the same amount of equipment, and the material was transferable from the homogenizing silos to the storage silos by gravity alone. But these plants still required complicated conveying means for extracting material from the storage silos and transferring the material to the next operation. In the case of a cement kiln installation, the extracted material must be lifted up to the kiln inlet which is normally located at a substantial level above ground level and during lifting the feed of material to the kiln has to be checked continuously, for example by weighing; this requires additional conveying means for returning any excessive amount of material to the storage silo.

It is an object of the present invention to provide a unique structural arrangement of homogenizing silos and storage silos which positions the maximum amount of equipment in the minimum amount of space and gives improved ease of material handling not heretofore achieved in silo plants. Broadly stated the invention is in a silo plant having at least one homogenizing silo and at least one storage silo, and is characterized by mounting the storage silo above the homogenizing silo and providing conveying means for transferring homogenized material from the homogenizing silo to the storage silo.

The silo plant has particular application where homogenization of the pulverulent material is effected by passing air under pressure through the material in finely divided air streams. If so, the homogenizing silos are designed as pressure vessels and the means for transferring material from the homogenizing silo to the storage silo through an upwardly extending tube can be achieved by lifting the material by means of raising the pressure of the air in the homogenizing silos to above atmospheric. The apparatus is also mounted with extracting means positioned between the storage silo and homogenizing silo for extracting material from the storage silo and conveying any surplus to the homogenizing silos by gravity. The extraction means are usually positioned above the next processing station, and at the weighing station and inlet to a rotary kiln and thus can be gravity fed to these respective stations.

A preferred embodiment of the invention is described hereinbelow with reference to the drawing in which the figure is an elevation, partly schematic, of a silo plant.

A silo plant 10 has a feed pipe 11 connected to a source of pulverulent material and leading to a cyclone 12; pneumatic means are used to convey the material from the material source to the cyclone for separation of the material. Connected to the outlet of cyclone is a screw conveyor 13 which conveys the material to a rotating distributor 14 which is connected to the outlet end of the screw conveyor. The rotating distributor 14 is positioned above two homogenizing silos 15 and 16 and rotates to ditstribute the material to each of the silos as required.

The homogenizing silos 15 and 16 are pressure vessels and have air supply pipes 17 and 18 connected to the lower end of the silos which are ultimately connected to a source of compressed air through supply pipe 19. The pulverulent material in the silos 15 and 16 is homogenized by finely divided air streams in the conventional manner. In one example as shown in the homogenizing silo 15, which is partly broken away, this means can be provided by a chamber defined along the conical walls of the homogenizing silo by a porous inner wall surface 31 which is concentrically spaced from the conical wall and is connected to the air supply pipe 17 and thereby directs finely divided streams of air into this lower portion of the homogenizing silo.

Connected to the outlets of the silos 15 and 16 is a bottom transverse section 20 of a pipe which leads to a vertical pipe 21 extending upwardly above the silos. Positioned above and overlying and spaced from the homogenizing silos 15 and 16 is a storage silo 22. Although only one storage silo 22 and two homogenizing silos 15 and 16 are shown, it is intended that any number of homogenizing or storage silos could be used in the plant within the scope of the invention; the underlying characteristics of the arrangement being that the storage silos are positioned above and overlie homogenizing silos to give the space-saving advantages and the ease of transportation of material.

The upward end of the vertical pipe 21 extends above the storage silo and is connected with a top transverse pipe section 23 which leads to an elbow 24 and is connected to the top of the storage silo 22. In conveying the pulverulent material from the homogenizing silo, any vents in the homogenizing silo are closed so that the pressure in the silo is increased sufficiently above atmospheric to force the pulverulent material through the bottom transverse section 20 of the pipe, up the vertical section 21 of the pipe and through the top transverse section 23 of the pipe and into the storage silo 22.

Positioned at the bottom of the storage silo is a material extracting device 25 which, as shown, is comprised of a pair of screw conveyors 26 and 27. The first screw conveyor 26 is directly connected to the bottom outlet of the storage silo 22 and material is conveyed along the screw conveyor to a first vertical outlet pipe 28. The outlet pipe 28 gravity feeds the material into the second screw conveyor 27 where it is conveyed transversely into a second outlet pipe 29. The second outlet pipe 29 usually gravity feeds the material to weighing apparatus (not shown) for weighing the material before it is further gravity fed to a processing operation, e.g. a rotary kiln.

The second screw conveyor 27 extends laterally beyond the outlet pipe 29 and has an overflow pipe 30 which extends from the end of the screw conveyor and is connected to the distributor to pass surplus materials back into either of the homogenizing silos 15 and 16 for recirculating back to the storage silo. This overflow is created because the apparatus is designed to extract material from the second screw conveyor by creating a column of material in the outlet from which the desired quantity of material per unit time is extracted by the weighing device.

I claim:

1. In a silo plant for pulverulent material comprising at least one storage silo, at least one homogenizing silo, said storage silo positioned above said homogenizing silo, conveying means for transferring homogenized material from the homogenizing silo to the storage silo, means for feeding non-homogeneous material to the top of the homogenizing silo and means for extracting homogenized material from the bottom of the storage silo.

2. A silo plant according to claim 1 in which said homogenizing silo is formed of a pressure vessel having means for homogenizing pulverulent material by passing air under pressure through the material in finely divided air streams, and said conveying means are comprised of at least one vertical tube leading from the homogenizing silo to the storage silo through which material is lifted by pressure above atmospheric in the homogenizing silo.

3. A silo plant according to claim 1 wherein said means for extracting homogenized material have overflow means connected to the homogenizing silo for passing extracted surplus quantities of air into the homogenizing silos by gravity.

References Cited

UNITED STATES PATENTS 2,723,838 11/1955 Peters _____ 259—4
3,158,362 11/7964 Seifarth _____ 259—180

FOREIGN PATENTS 1,034,464 7/1958 Germany.

WALTER A. SCHEEL, *Primary Examiner.*

R. W. JENKINS, *Assistant Examiner.*